(12) United States Patent
Brahmavar et al.

(10) Patent No.: US 6,408,502 B1
(45) Date of Patent: Jun. 25, 2002

(54) METHOD FOR A RESILIENT ROTOR CORE ASSEMBLY

(75) Inventors: Subhash M. Brahmavar; Kamron M. Wright, both of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,679

(22) Filed: May 18, 2001

(51) Int. Cl.[7] ............................................. H02K 15/16
(52) U.S. Cl. ............................................ 29/596; 29/598
(58) Field of Search .................................. 29/596, 598

(56) References Cited

U.S. PATENT DOCUMENTS

| | | | | |
|---|---|---|---|---|
| 3,728,563 A | * | 4/1973 | Stone | 29/596 |
| 4,578,852 A | * | 4/1986 | Sauerwein et al. | 29/596 |
| 4,793,054 A | * | 12/1988 | Abbratozzato et al. | 29/596 |
| 5,079,466 A | | 1/1992 | Jones | |
| 5,099,164 A | * | 3/1992 | Wheeler | 29/596 |
| 5,177,858 A | | 1/1993 | Jones | |
| 5,276,958 A | * | 1/1994 | Larsen | 29/596 |
| 5,636,432 A | | 6/1997 | Usher et al. | |
| 5,758,709 A | | 6/1998 | Boyd, Jr. | |
| 5,771,566 A | * | 6/1998 | Pop, Sr. | 29/598 |
| 5,915,750 A | | 6/1999 | Usher et al. | |

FOREIGN PATENT DOCUMENTS

| | | | | |
|---|---|---|---|---|
| EP | 0265364 | * | 4/1988 | 29/596 |

* cited by examiner

*Primary Examiner*—Carl J. Arbes
(74) *Attorney, Agent, or Firm*—Karl Vick, Esq.; Damian Wasserbauer, Esq.; Armstrong Teasdale LLP

(57) ABSTRACT

A rotor mount assembly, located between a rotor shaft and a plurality of magnetic elements, resiliently damps vibrations induced from the plurality of magnetic elements. The rotor mount assembly includes a first resilient ring, a second resilient ring, and a laminated spacer. The laminated spacer includes laminates from a stator core center punch. Both resilient rings include an inner metal insert which, in one embodiment, comprises laminates.

5 Claims, 4 Drawing Sheets

METHOD FOR A RESILIENT ROTOR CORE ASSEMBLY

BACKGROUND OF INVENTION

This invention relates generally to electric motors and, more particularly, to methods and apparatus for reducing vibration in a rotor assembly for electric motors.

Electric motors are used in countless varieties and applications worldwide. Typically, the rotational force and torque generated within the motor is delivered by a rotor shaft. The torque generated is the product of current applied to the motor and an electromagnetic field maintained in a stator. When a rotor generated magnetic field enters a stator generated magnetic field the rotor tends to speed up, and when the rotor magnetic field leaves the stator magnetic field the rotor tends to slow down. The torque produced is therefore non-uniform, and known to those in the art as torque ripple or cogging. Torque ripple produces objectionable noise and vibration at the motor shaft in some applications.

One example of such an application occurs when a motor drives a fan. Imbalances in the fan, combined with torque ripple, produce vibrations which are transmitted to the motor and fan mounting. These vibrations produce undesirable noise. Continued exposure over time to such vibrations loosens motor and fan assemblies, and ultimately failure of the motor. Damping systems are typically employed to minimize the effects of the vibrational energy induced into the motor and fan system.

SUMMARY OF INVENTION

A motor that includes a laminated rotor mounting assembly facilitates reducing or eliminating torque ripple and vibrations produced in a rotor core is described. The motor includes a stator assembly and a rotor assembly within a housing. The rotor assembly includes a rotor shaft, a plurality of magnetic elements and a rotor mounting assembly therebetween. The rotor mounting assembly includes a pair of resilient rings and a laminated spacer. Each resilient ring includes an inner metal insert and a resilient insert. In the exemplary embodiment the resilient ring includes a laminated outer annular ring which attaches to the laminated spacer. In another embodiment the laminated spacer circumferentially encloses the resilient ring. The inner metal insert attaches to the rotor shaft and the magnetic elements attach to the outer cylindrical surface of the spacer.

During operation, the rotor assembly rotates to align with a magnetic field generated within the stator assembly. The non-uniform magnetic fields generate torque ripple in the rotor core. The resilient inserts of the rotor mounting assembly damp vibrations and noise that may be generated as a result of such torque ripple. Reductions in torque ripple reduce vibrations and noise of the motor. As a result, more complex and expensive damping systems may be eliminated. The laminated outer annular ring and laminated spacer provide a reliable and cost-effective interface between the resilient inserts and the plurality of magnetic elements.

DETAILED DESCRIPTION

Figure 1:
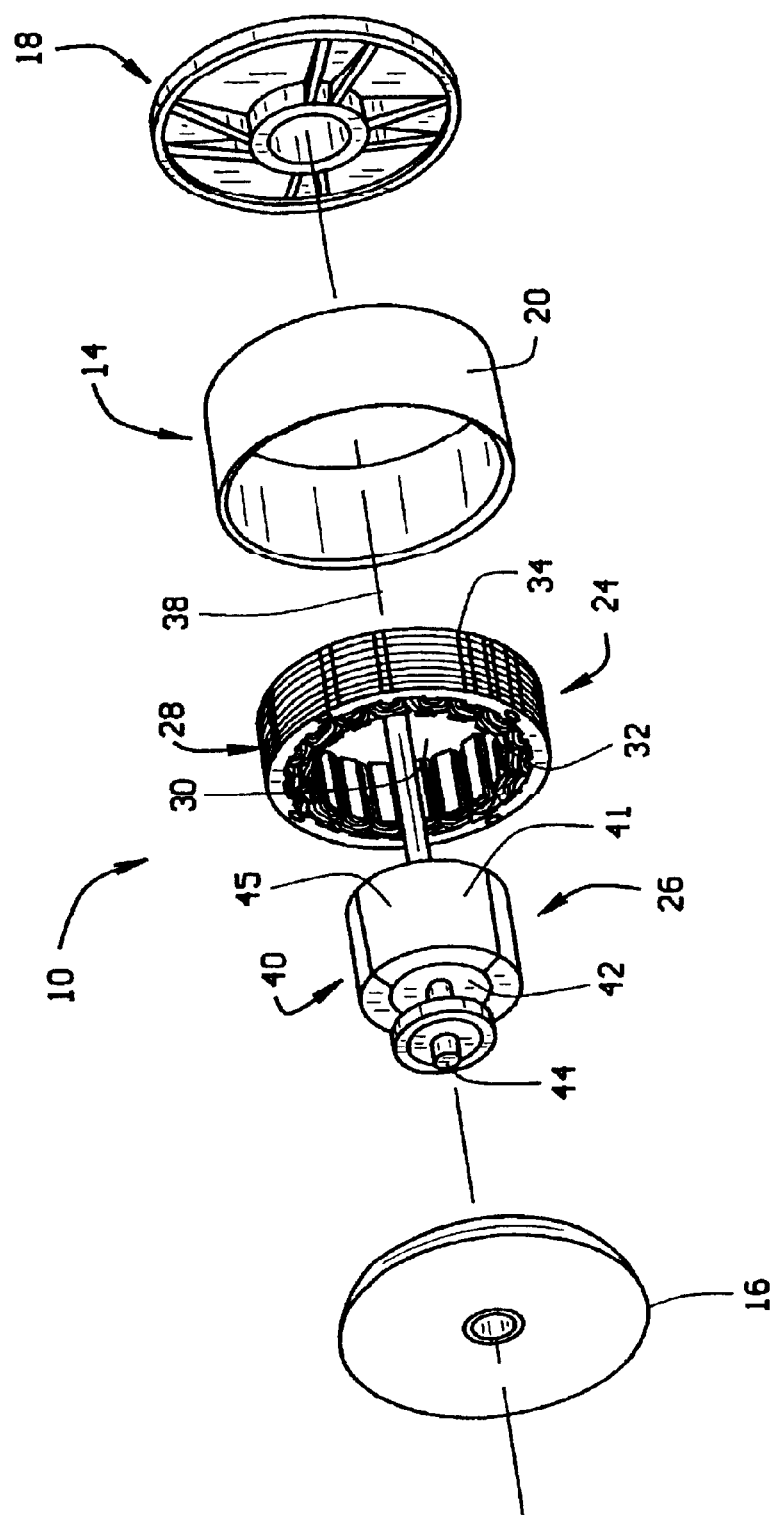
FIG. 1 is an exploded perspective view of a motor.

FIG. 1 is an exploded perspective view of a motor 10 including a motor housing assembly 14. Motor housing assembly 14 includes end shields 16, 18 and a shell 20. End shields 16, 18 connect to shell 20 with a plurality of fasteners (not shown) such that a cavity is defined by end shields 16, 18 and shell 20. In one embodiment, end shields 16, 18 are cast aluminum and shell 20 is rolled and welded steel. In one embodiment, motor 10 is an electronically commutated motor for use in heating, ventilation, and air conditioning (HVAC) systems such as a GE 39 Frame motor commercially available from General Electric Company, Plainville, Conn., and manufactured in Springfield, Miss.

Figure 2:
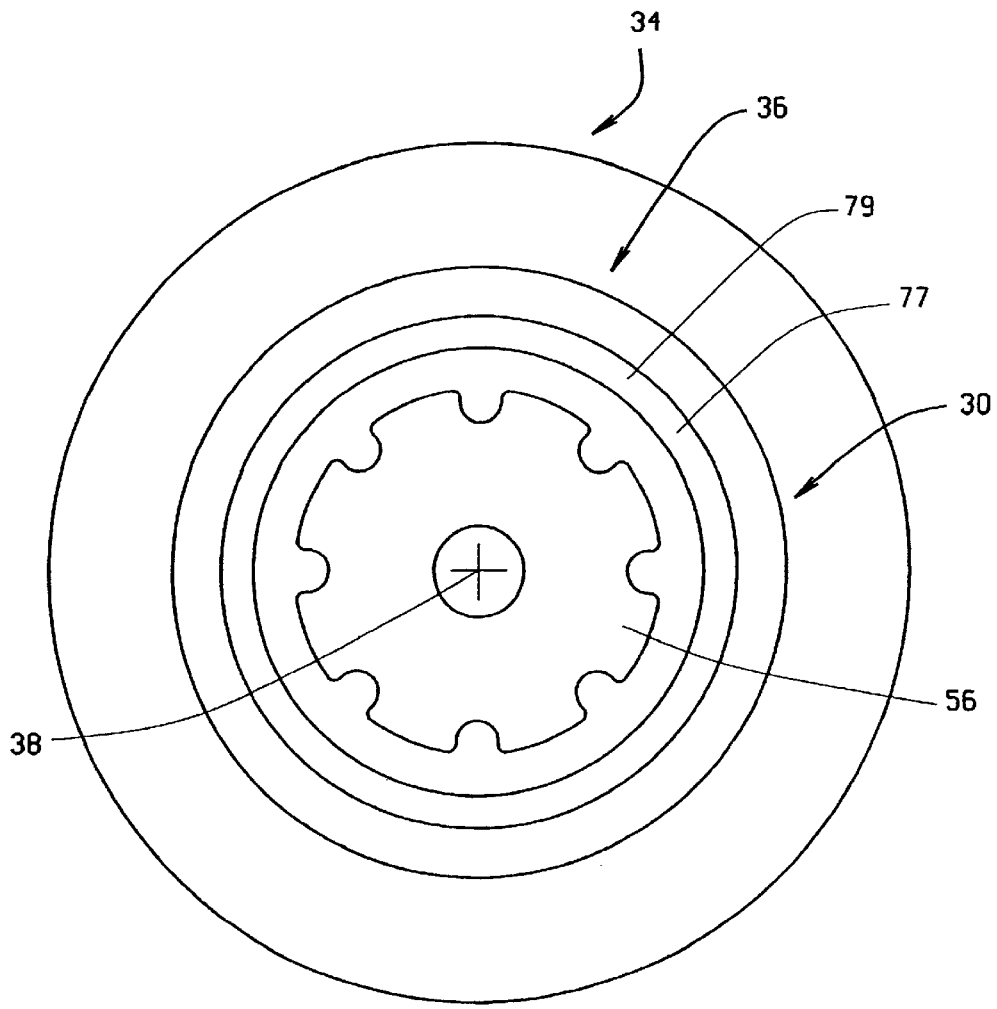
FIG. 2 is an enlarged top view of a laminate element.

A stator assembly 24 and a rotor assembly 26 are positioned within the cavity created by end shields 16, 18 and shell 20. Stator assembly 24 includes a stator core 28 with a stator bore 30 extending therethrough. Stator core 28 provides support for a plurality of stator windings 32. FIG. 2 is an enlarged top view of a laminate element 34. Stator core 28 is fabricated from a plurality of laminate elements 34. Specifically, stator bore 30 is formed by punching a center blank lamination 36 from each laminate element 34 and the subsequent interlocking of the laminate elements 34. In an exemplar embodiment, stator bore 30 is substantially cylindrical about a central axis 38.

Rotor assembly 26 is positioned within stator bore 30 and includes a rotor core 40, a plurality of magnetic elements 41, a rotor mounting assembly 42, a rotor shaft 44, and an outer rotor surface 45. Rotor shaft 44 is substantially concentric about axis 38 and rotor shaft 44 axially extends through rotor mounting assembly 42. Rotor mounting assembly 42 supports magnetic elements 41.

Figure 3:
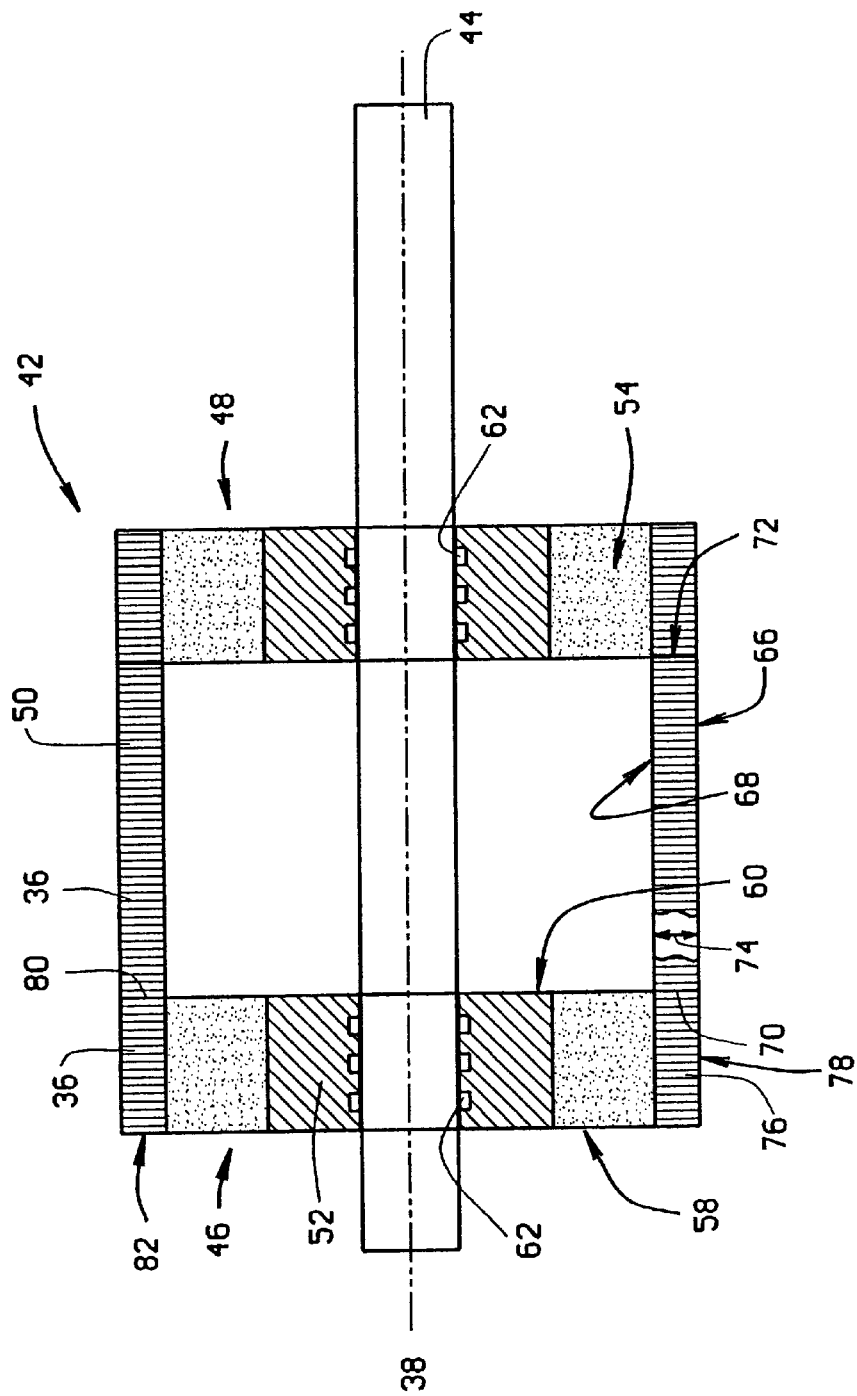
FIG. 3 is cross-sectional view of an exemplary embodiment of a laminated rotor core assembly.
Figure 4:
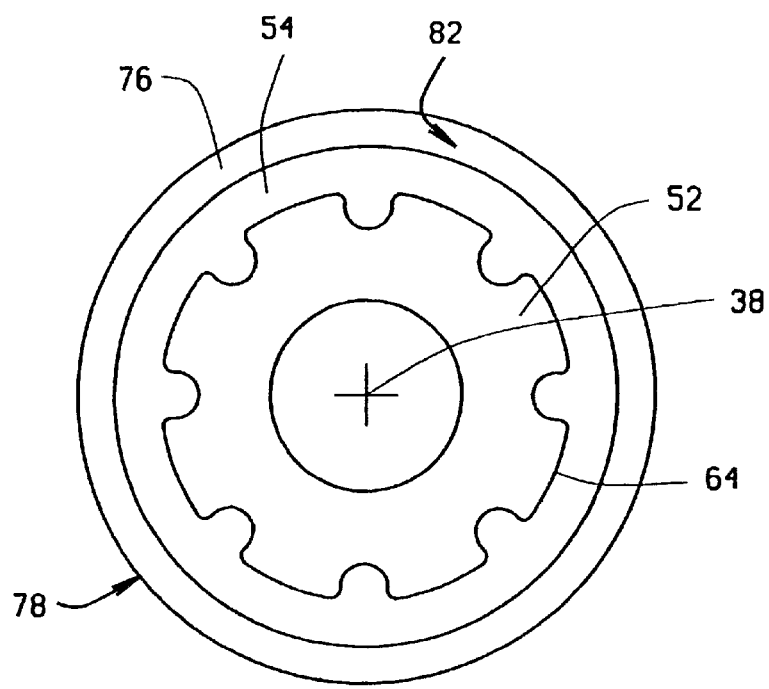
FIG. 4 is a side view of a resilient ring of the laminated rotor mounting assembly of FIG. 3.
Figure 5:
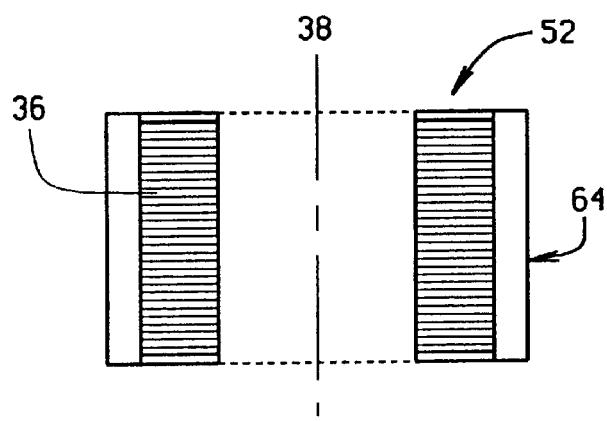
FIG. 5 is a cross-sectional view of an inner metal insert of the rotor mounting assembly of FIG. 3.

Rotor mounting assembly 42 includes a first resilient ring 46, a second resilient ring 48 and a laminated spacer 50. Each resilient ring 46, 48 includes an inner metal insert 52 and a resilient insert 54. As shown in FIGS. 3 and 4, resilient insert 54 circumferentially encloses and abuts inner metal insert 52. Since resilient rings 46, 48 are substantially identical, only resilient ring 46 is described. Resilient ring 46 includes an external end 58 and an interior end 60.

Inner metal insert 52 circumferentially attaches to rotor shaft 44. In one embodiment, rotor shaft 44 includes a pair of knurled portions 62 that facilitate a secure press fit relationship between rotor shaft 44 and inner metal insert 52. Inner metal insert 52 includes an outer cylindrica[008c] edge 64. In one embodiment, outer cylindrical edge 64 is scalloped, as illustrated in FIG. 4, to facilitate coupling between inner metal insert 52 and resilient insert 54. In one embodiment, inner metal insert 52 is fabricated from a plurality of insert laminations 56 punched from a plurality of center blank laminations 36. Insert laminations 56, punched to specific dimensions are interlocked to provide a cost-effective and reliable inner metal insert 52.

Laminated spacer 50 includes an outer cylindrical surface 66, an inner cylindrical surface 68, a first radial side 70 and a second radial side 72, and has a thickness 74 between outer cylindrical surface 66 and inner cylindrical surface 68. Laminated spacer 50 is fabricated from a plurality of spacer laminations 79 punched from a plurality of center blank laminations 36 as shown in FIG. 2. In one embodiment, spacer laminations 79 are punched and interlocked to form laminated spacer 50. Outer cylindrical surface 66 is sized to accommodate magnetic elements 41. Magnetic elements 41 attach to outer cylindrical surface 66 of laminated spacer 50 and define outer rotor surface 45. In one embodiment, magnetic elements 41 include arc magnets as used in a brushless DC motor, wherein outer cylindrical surface 66 is sized to facilitate attachment of arc magnets. In an exemplary embodiment, magnetic elements 41 are secured to outer cylindrical surface 66 by adhesive (not shown). Inner cylindrical surface 68 does not contact rotor shaft 44. Thickness 74 may be varied to optimize laminated spacer mass for noise reduction.

In the exemplary embodiment resilient ring 46 further includes a laminated outer annular ring 76, which circumferentially encloses and abuts resilient insert 54. Laminated outer annular ring 76 is fabricated from a plurality of outer annular ring laminations 77 formed from a plurality of center blank laminations 36. In one embodiment, as illustrated in FIG. 2, outer annular ring laminations 77 are punched and interlocked to form laminated outer annular ring 76. As illustrated in FIGS. 3 and 4, laminated outer annular ring 76 includes an outer cylindrical portion 78, an interior radial face 80, and an external radial face 82. Interior radial face 80 attaches to first radial side 70 of laminated spacer 50. In one embodiment, shown in FIG. 3, interior radial face 80 interlocks with laminated spacer 50 to extend outer cylindrical surface 66. In the exemplary embodiment interior radial face 80 is substantially coplanar with interior end 60.

In an alternative embodiment, laminated spacer 50 circumferentially encloses resilient ring 46, which does not include a laminated outer annular ring. Rather, laminated spacer 50 extends to external end 58 of resilient ring 46.

Laminated spacer 50 is fabricated using methods known in the art. In one embodiment, laminate elements 34 are punched and laminated to form stator bore 30 in stator core 28. The punched out center blank laminations 36 are further punched to form spacer laminations 79 which are interlocking to form laminated spacer 50. In an alternative embodiment, center blank laminations 36 may be specifically sized and spacer laminations 79 punched during the stator bore punching. Spacer laminations 79 are interlocked by methods known in the art, such as adhesive bonding, interlocking features, mechanical pinning, or welding.

Resilient insert 54 is fabricated from a suitable rubber material or elastomer. As is known in the art, an insert molding or transfer molding press process is used to attach resilient insert 54 to inner metal insert 52.

During operation, as motor 10 is energized, magnetic elements 41 (shown in FIG. 1) rotate to align. with a magnetic field. generated within stator assembly 24 (shown in FIG. 1). As torque ripple occurs in magnetic elements 41, resilient insert 54 of rotor mount assembly 42 damps vibrations and non-uniform torque transmitted to rotor shaft 44. As a result, motor operation is quiet and smooth. More complex and expensive damping systems may be eliminated. Laminated outer annular ring 76 and laminated spacer 50 contribute to a reliable and cost-effective assembly between rotor shaft 44 and magnetic elements 41.

While the invention, has been described in terms of various specific embodiments, those skilled in the art will recognize that the invention can be practiced with modification within the spirit and scope of the claims.

What is claimed is:

1. A method of constructing a rotor mount assembly to facilitate damping vibration of a rotor shaft, said method comprising the steps of:

coupling a first resilient ring on the rotor shaft;

coupling a second resilient ring on the rotor shaft;

attaching a laminated spacer to the first resilient ring and the second resilient ring; and attaching a plurality of magnetic elements to the spacer.

2. A method according to claim 1 wherein said step of attaching a laminated spacer comprises the step of interlocking the laminated spacer to the first resilient ring and the second resilient ring.

3. A method according to claim 1 wherein said step of attaching a laminated spacer comprises the step of press fitting the spacer circumferentially onto the first resilient ring and the second resilient ring.

4. A method according to claim 1 wherein said step of attaching a plurality of magnetic elements comprises the step of attaching a plurality of arc magnets to the spacer.

5. A method according to claim 1 wherein said step of attaching a laminated spacer further comprises the step of:

punching a plurality of ring laminations from a plurality of stator laminate elements; and interlocking the plurality of ring laminations to form a substantially cylindrical hollow spacer.

* * * * *